March 5, 1940.  P. SCHARR  2,192,652
ELECTRIC RANGE OR STOVE
Filed June 26, 1937
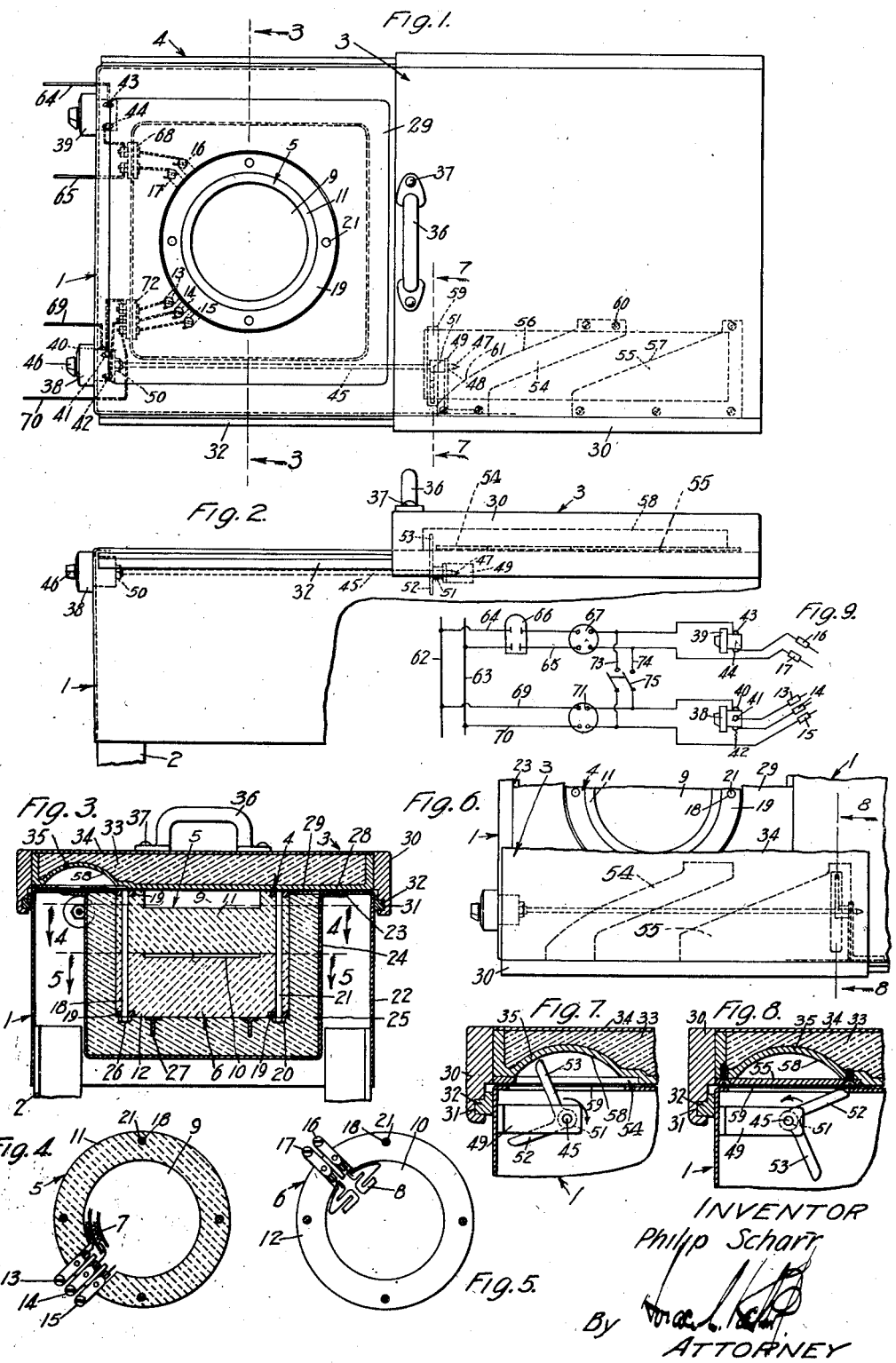
INVENTOR
Philip Scharr
By
ATTORNEY Patented Mar. 5, 1940

2,192,652

UNITED STATES PATENT OFFICE 2,192,652

ELECTRIC RANGE OR STOVE

Philip Scharr, West Hartford, Conn.

Application June 26, 1937, Serial No. 150,589

12 Claims. (Cl. 219—37)

My invention relates to electric ranges or stoves.

It has among its objects to provide an improved heating unit applicable to electric ranges or the like for cooking or heating which will be especially of value in taking advantage of off-peak supply rates. Further objects of my invention are to provide an improved electric heating unit, which has improved means for quick heating during the day, or during the electric utility's supply peak when rates are high, and means for effectively shutting off an element of such unit during the night, or off-peak period; and to provide an improved heating means in the unit which is adaptable to being turned on or off at any time to assist in heating, to supply heat for so-called waterless cooking, and economically maintain the temperature of the heating unit during periods when the unit would normally become cold through radiation. Other objects include the provision of an improved cover to insulate the heating unit and to prevent radiation and dissipation of heat by effectively shutting off a peak load coil or element and the provision of an element, which may be automatically operated, embedded in the heating unit for increasing cooking speed and insuring quick recovery of the unit to high temperatures. Yet another object is to provide an improved controlling mechanism for such a unit including a control for a peak load coil to shut off the coil automatically when a cover is moved over the heating unit. These and still other objects of my improved heating unit will be more apparent from the drawing and description which follow.

In the accompanying drawing I have shown for purposes of illustration one embodiment which my invention may assume in practice.

In the drawing—

Figure 1 is a top plan view of an electric range constructed in accordance with my improvements;

Fig. 2 is a side elevation of the same, the under portion being broken away;

Fig. 3 is a sectional view taken on the line 3—3 in Fig. 1 but with the sliding cover in a closed position over the heating unit;

Fig. 4 is a view partially in section, of the top heating element taken on the line 4—4 in Fig. 3;

Fig. 5 is a plan view of the lower heating element taken on the line 5—5 in Fig. 3;

Fig. 6 is a fragmentary plan view showing the top of the electric range with the cover in a closed position over the heating unit, the cover being partially broken away;

Fig. 7 is a sectional view on the line 7—7 in Fig. 1 showing the switch control when the switch is free to be opened or closed, with the cover in a retracted position;

Fig. 8 is a sectional view on the line 8—8 in Fig. 6 showing the switch control when the cover is in a closed position, and Fig. 9 is a diagrammatic view showing the connections to the respective heating coils in the heating unit.

In this form of my invention a main frame or body 1 is adapted to be supported at a convenient level by suitable legs 2, the frame being divided into a cover or table top section 3 and a heating unit section 4 with space therein for mounting two heating elements 5 and 6 preferably arranged directly one over the other, these heating elements herein forming parts of an improved unit and also having improved controlling means as hereinafter described.

The heating elements 5 and 6 are shown in Figs. 4 and 5 respectively, and may be constructed with typical resistance or heating coils 7 and 8 fitting into depressed areas or recesses 9 and 10 respectively of upper and lower heat storage bodies 11 and 12. In order to increase the heat retaining characteristics of the bodies 11 and 12, these portions are made of soapstone or other material equally suited for the purpose. Also, to facilitate combining the two elements 5 and 6 into a single unitary structure, the bodies 11 and 12 are preferably made cylindrical in form and of equal diameters. The upper or main element 5 being exposed provides quickly available heat and may have coils 7 for producing a low heat or a high heat, and for this reason is shown to be provided with three insulated terminal connections 13, 14 and 15 extending through slots in the side of the body 11 at a level with the bottom of the depressed area 9. The lower or supplementary heating element 6 however, which is the heating means for the heat storage bodies, is provided with coils 8 of a single resistance type and having two insulated terminals 16 and 17 extending through slots in the side of the body 12 but at a point substantially 90 degrees disposed from the terminals 13, 14, 15 of the element 5 when both elements are combined to form a unitary member.

For purpose of rigid construction and utility, the bodies 11 and 12 of the heating elements 5 and 6 are drilled or otherwise provided with holes 18 running parallel with the center axes of the elements and located in close proximity to the outer periphery of the respective body members 11 and 12. On the upper surface of element 5 and on the lower surface of element 6 areas are formed to permit the insertion of annular bands 19, while nuts 20 cooperate with bolts 21 in drawing the separate elements 5 and 6 together to form a single heating unit.

The heating unit section 4 of the range has an enameled sheet iron frame 22 shaped and bent inwardly at the upper corners and pressed to form a shoulder 23 near the edge of the heating unit section. Upon the surface of the frame thus formed by the shoulder 23, a retainer and support 24 for the heating unit may be adapted to rest, the retainer 24 perferably being rectangular in shape and of a size which will permit it to be lifted through the area enclosed by the shoulder 23 of the frame. It is desirable to employ a material 25 having a high specific heat value and one that is a particularly good insulator, such as mineral wool or suitable insulating material, preferably in loose or powdered form, to line the unit retainer 24, the outer part of the insulating material 25 conforming with the wall of the retainer, while the inner wall is cylindrically shaped to permit the unit comprising heating elements 5 and 6 to be lowered therein. Recesses at 26 are formed in the base of the insulating material 25 to receive the heads of bolts 21 and to give opportunity for the joined elements to receive level support. It may also be desirable to provide T-iron brackets 27 set in recesses in the base of the insulating material and running laterally thereof to insure that the weight of the elements 5 and 6 is firmly carried without danger of cracking the soapstone or other material of the respective body members 11 and 12.

The retainer 24 has a flange 28 extending outwardly from its upper edge nearly to meet the inner bent corner surface of the frame 22 and on this flange 28 is preferably firmly joined a cover plate 29. The outer periphery of the cover plate 29 is adapted to fit inside the shoulder 23, and the edge of the plate rests against the inwardly bent frame 22 giving support for the retainer and heating unit, while the inner edge of the plate is cut circularly to cover the top surface of the insulating material 25.

Herein the electric range 1 is provided with an improved longitudinally slidable cover or table top section 3 for covering and insulating the heating unit section 4. In the embodiment of my invention shown in the drawing, the cover 3 is constructed with edge members 30 having grooves 31 near the bottom of the inner edge of the same for cooperating with rails 32 on each side of the frame of the range and along which the cover is in slidable engagement. The cover 3 has a suitable insulating material 33 which is held between a flat cover plate 34 and a shaped under frame 35 which may be welded or otherwise attached to the cover plate 34 and the edge members 30. A convenient handle 36 for the cover 3 and adapted to slide the same, is attached at one end of the cover plate 34 by bolts or rivets 37.

At one end of the frame of the range and adjacent the heating unit section 4 are switches 38 and 39 for the heating elements 5 and 6 respectively. Of these, the switch 38 has an intermediate stop or connection for turning on the low heating portion of the coil 7 and a full stop for turning on the entire coil for high heat, while the switch 39 is of the on and off snap type common to electric range use. Switch 38 has terminals 40, 41, 42 and switch 39, terminals 43 and 44 hereinafter described.

In accordance with the improved construction of my invention, improved controlling means is provided in the switch 38 for the upper heating element 5. As shown, it has a rod 45 connecting directly with a button 46 on the switch and extending laterally of the heating unit section to a point under the cover 3 when the latter is in a retracted or open position as shown in Figures 1 and 2. The rod 45 is given a pointed end as at 47 for threading the same through a hole 48 in a supporting bracket 49 attached to the side frame of the range 1. At the switch end of the rod 45, a nut 50 is assembled on suitable threads on the rod in order to prevent end play of the rod relative to the switch when the switch button 46 is turned together with the rod. At the opposite end of the rod 45, a pawl 51 is suitably fixed to the rod for turning the same when the cover 3 is slid forward over the heating section 4 and for shutting off the current through the switch 38 and maintaining an open circuit to the heating element 5 as long as the cover 3 is in its advanced or forward position.

To accomplish these ends, the pawl 51 may have arms 52, 53 swingable through 180 degrees as the switch button 46 is turned from its off to its high position, and the under surfaces of the table top section 3 may be provided with suitable horizontally disposed cams 54, 55 having surfaces 56 and 57 adapted to make sliding contact with the arms 52 and 53 of the pawl 51 and to rotate the rod 45 when the top section 3 is slid forward, shutting off the switch and locking the same in its off position. Herein also, an arched area 58 is formed in the under frame 35 of the cover 3 in a location to be centered axially over the rod 45 and to give sufficient space for the arms 52, 53 of the pawl to rotate without striking the under surface when the cover is moved. Also, at the end of the cover adjacent the heating unit section 4 and the bracket 49, a slot 59 is made in the top of the frame to permit the arms of the pawl to extend upward from the bracket and rod 45 into the space under the cover and to make contact with the cam surfaces 56 and 57 as the cover is moved. The cams 54 and 55 are rigidly screwed or bolted to the underframe 35 by bolts 60 at each side of the arched area 58, the cam 54 being cut away, as at 61, to allow full movement of the pawl arms 52, 53 when the cover 3 is in a retracted position.

In Figures 7 and 8, the pawl arms 52 and 53 are shown in switch operative and inoperative positions respectively. In Figure 7, the cover 3 is open and it will be appreciated that the rod 45 which is connected with the switch 38 is free to move the pawl and its arms to any position in the direction indicated by the arrow, the pawl in this figure being at the end of its movement in a counter-clockwise direction and in the position which corresponds to the full on position of switch 38. In Figure 8, the pawl arms are shown with the switch off, which position it must maintain with the cover 3 closed, since the switch is at the end of its movement in a clockwise direction and the pawl arm 52 if moved in the direction of the arrow, cannot be moved further than the point where it comes in contact with the bottom of the cam 55. In operation, as the cover 3 is moved forward over the heating unit section 4 the arm 53 of the pawl, if the switch is on (Fig. 7) is brought into contact with the cam surface 56 along which it slides until the pawl has been thrown through 90 degrees, at which point the cover will have reached a half closed position and switch 38 will be in its low heat position; whereas, as the cover is moved further in a closing direction the arm 52 of the pawl similarly slides along the surface 57 of cam 55 until the pawl has been thrown through a full 180 degrees and switch 38 is in the off and locked position of Figure 8.

Connections are preferably made with supply service conductors 62 and 63 as shown in Figure 9 by leads 64, 65 running from the conductors through a time clock 66 and night meter 67 to the switch terminal 43 on the switch 39 and to the terminal 17 on the coil for operating the heating element 6. The switch 39 is connected with the coils 8 of element 6 by a wire running between terminal 44 on the switch and terminal 16 on the coil through a suitable insulator 68 in the wall of the unit retaining member 24. Connections with the conductors 62 and 63 may also be made to the switch 38 and coils 7 by leads 69 and 70 through a day meter 71, while the terminals 41 and 42 of the switch 38 are connected with the terminals 13 and 14 on the coils 7 through an insulator 72. To permit use of the heating element 6 when the time clock 66 has opened the circuit, interconnections 73 and 74 are provided between the respective circuits running from the switches 38 and 39, and a knife switch 75 is placed across the interconnections for permitting current to flow through the day meter 71 to the switch 39 at will. This arrangement permits use of the coil 8 during the period when the time clock 66 otherwise shuts off current to switch 39.

An objection to many electric ranges or heating units is that they are slow in reaching the desired degree of heat even when turned on to a high heating level and that the cost of maintaining heat in the unit is often prohibitive. In obviating these difficulties, the advantages of the unitary heating section of my invention, having an auxiliary heating element embedded in the unit, will be apparent. When the use of the upper or main heating element 5 is discontinued at the end of the day, the cover 3 may be pulled forward over the heating unit section 4, whereupon the switch 38 to the upper heating element is automatically turned by the cams 54 and 55 to a locked off position. The insulation 33 of the cover tends to hold heat stored up during the day within the unit, but it is advantageous to turn on the switch 39 to the lower heating element 6 when the cover is closed, for by so doing, when the time clock 66 operates at the beginning of the low rate period, current will flow through the night meter from the supply conductors 62, 63 to the coil 8 of the lower or supplementary heating element 6. During the night, the unit is kept at an intermediate temperature by the coil 8, and yet the unit is protected against the danger of excessively high temperatures, which might cause damage under the closed cover, by the effective locking of the switch 38 in an off position, from which it cannot be changed to energize the coil 7 without sliding back the cover and removing the danger. If it is desired to supplement the heat from the element 5 or to maintain heat in the unit when the element 5 is not in use during the day period, the knife switch 75 may be closed and the switch 39 turned on so that current will flow through the day meter to the element 6.

It will be appreciated that the unitary structure of the elements 5 and 6 within the insulation 25 of the retainer member 24 insures a maximum protection against loss of heat when either or both of the heating elements are in use. Also the location of the lower element 6 directly under the upper or surface element 5 permits the lower coil 8 to be used alone for purposes of waterless cooking, simmering or other forms of heating requiring only a low degree of heat.

While I have in this application specifically described one form of my invention, it will be understood that this form is shown for purposes of illustration, and that the invention may be modified and embodied in various other forms without departing from its spirit or the scope of the appended claims.

What I claim as new and desire to secure by Letters Patent is:

1. An electric range comprising a heating unit having a heat storage block and upper and lower heating elements respectively carried thereon and embedded therein, means including an insulated retainer enclosing said storage block, a movable heat insulating cover cooperating with said heating unit and movable over the same relative to both of said heating elements, an electric switch for each of said heating elements accessible for operation in all positions of said cover, and switch controlling means inoperative during opening movement of said cover and actuated upon closing movement of said cover for actuating the switch for said upper element and shutting off current to said upper element.

2. An electric range comprising a heat storage unit having upper and lower heating elements, a cover movable over said unit relative to both of said elements between one position in which said unit is covered and another in which said unit is uncovered, switches for controlling current to said upper and lower elements accessible for operation in all positions of said cover, cam means carried by said cover, and means operated by said cam means and connected with the switch for said upper element for opening the latter, if closed, when the cover is moved over said unit to cover the same, said means being inoperative to close said switch when the cover is moved to open position and the switch for said lower element being operative in both positions of said cover.

3. An electric range comprising a heat storage unit having upper and lower heating elements, a cover horizontally slidable over said unit relative to both of said elements, switches for controlling current to said elements accessible for operation in all positions of said cover, a rod having one end operatively connected with the switch for said upper element and having arms disposed at the opposite end of said rod and below the level of said cover, and cam means carried by said cover for rotatably operating said arms and rod as said cover is closed to open the switch for said upper element.

4. An electric range comprising a heat storage unit having an upper main heating element and a supplementary heating element therebeneath, and heat storage means located in heat conducting proximity to said supplementary element, separate switches for each of said elements constantly accessible for a manual operation and connected with current supply lines, a movable cover for covering said storage unit in one position of said cover while exposing said switches including a heat insulating member, and means for opening the switch to said main element when said cover is moved over said storage unit while said switch is closed and for maintaining said switch in open position while said cover remains closed, said means being inoperative to actuate said switch when said cover is moved to open position.

5. An electric range comprising a heat storage unit having heat storage means, an upper high and low heat element for ordinary cooking, and a supplementary element for heating said storage means, separate switches for each of said elements connected with current supply lines including a switch for said high and low heat element having high and low heat positions, means including a movable cover for covering said storage unit in one position of said cover, and means actuated by said cover for moving said last mentioned switch to open position irrespective of whether it is in high or low heat position when said cover is moved over said storage unit.

6. In an electric range, a heater compartment, heat storage means in said compartment, a heater element in said compartment in position to impart heat to said storage means, a quick heating heater element in said compartment located above said storage means, separate electric switches controlling the energization of said heater elements, said switches normally being freely movable between off and on positions, a longitudinally slidable cover for said compartment movable into compartment closing position while exposing both of said switches, and means responsive to closing movement of said cover for moving the switch of said second heater element, if on, from on to off position and having means for holding the same in off position as long as said cover remains closed.

7. In an electrical heating device, a stationary heating element, a switch for turning on and shutting off said heating element, a manually movable cover longitudinally slidable reversely into and out of covering relation to said heating element, and means for operating said switch to shut off said heating element and hold said switch in off position actuated by said cover when the latter is moved to said covering position and inoperative to operate said switch when said cover is moved into uncovering position.

8. In an electrical heating device, a heating element, means for supplying current thereto including a switch, a cover reciprocable reversely into and out of closed position over said element and when in closed position exposing said switch, and means actuated by said cover when the latter is moved to closed position for shutting off said switch and inoperative to operate said switch when said cover is moved into uncovering position.

9. In an electrical heating device, a stationary heating element, a manually operable rotary switch for turning on and shutting off said heating element, a manually movable cover longitudinally slidable reversely into and out of covering relation to said heating element, and means for operating said switch to shut off said heating element and hold said switch in off position when said cover is moved to covering position including cooperating elements, one comprising cam means longitudinally slidable with the cover and the other comprising cam follower means rotatable with the switch for converting sliding movement of said cover into rotary movement of said switch.

10. In an electrical heating device, a stationary heating element, a manually operable switch for said element rotatable between high, intermediate and off heat positions, a manually movable cover longitudinally slidable reversely into and out of covering relation to said heating element, and means to rotate said switch to off heat position and hold said switch in off position when said cover is moved to covering position including cooperating elements, one comprising cam means longitudinally slidable with the cover and the other comprising a plurality of cam follower arms successively operated by said cam means and rotating said switch from either of said high or intermediate positions into off position.

11. In combination, a heat storage device having a heating element, a quick heating element above said element, each element being connected in a separate circuit and having an independently operable controlling switch, a manually movable cover member horizontally slidable reversely between an open position and a closed position in which it covers both of said heating elements, and means operative by said cover when moved to closed position to shut off the switch of said quick heating element if its switch is closed and hold said switch in off position while the other switch remains unoperated and free to be moved to on or off position.

12. An electric range comprising a heat storage unit having a heating element, a switch controlling current to said element, a quick heating element above said storage unit, a switch controlling current to the latter element, a movable cover for said unit movable relative to both of said elements into and out of covering position, and switch actuating and locking means including a switch actuating element actuated by said cover as the latter is moved into covering position for automatically insuring opening and preventing subsequent closing of the switch to said quick heating element while said cover is closed and while enabling opening of said cover without closing said switch, both of said switches being accessible in all positions of said cover and said switch controlling the storage unit element remaining operative at will irrespective of the position of said cover.

PHILIP SCHARR.